March 2, 1948.  S. B. PICKLES  2,436,823
COURSE MODIFYING SYSTEM
Filed July 7, 1945  2 Sheets-Sheet 1
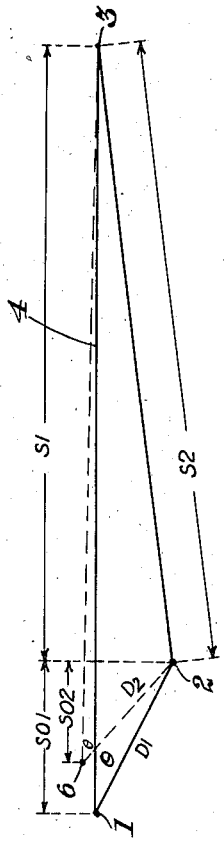
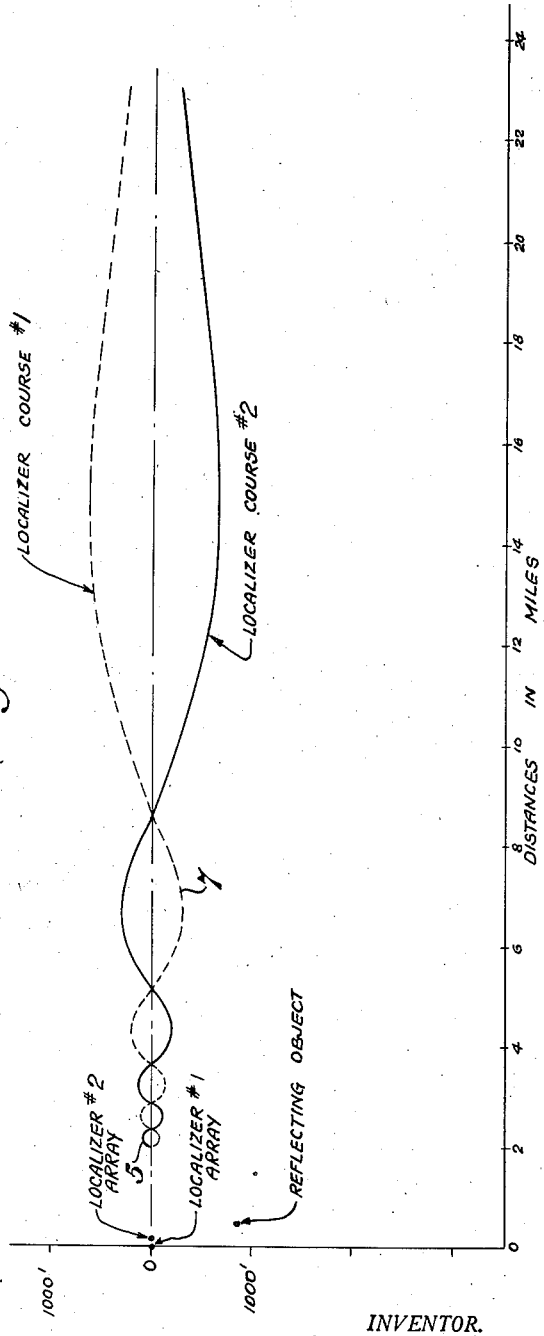
INVENTOR.
SIDNEY B. PICKLES
BY
R P Morris
ATTORNEY March 2, 1948.    S. B. PICKLES    2,436,823
COURSE MODIFYING SYSTEM
Filed July 7, 1945    2 Sheets-Sheet 2

INVENTOR.
SIDNEY B. PICKLES
BY
R. P. Morris
ATTORNEY

Patented Mar. 2, 1948

2,436,823

UNITED STATES PATENT OFFICE 2,436,823

COURSE MODIFYING SYSTEM

Sidney B. Pickles, Jackson Heights, N. Y., assignor to Federal Telephone and Radio Corporation, New York, N. Y., a corporation of Delaware Application July 7, 1945, Serial No. 603,689

11 Claims. (Cl. 250—11)

This invention relates to course modifying systems and more particularly to a system for modifying localizer beacon courses to correct for errors caused by reradiation or reflection.

In radio beacons used for localizer and for radio ranges, difficulties in the way of course bends and multiple courses may be produced by reflection of the radio beacon signals by objects in the radiation field thereof. Systems to correct for these errors have been proposed and mathematically it appears that these course bends may be largely eliminated either by the simultaneous transmission of several frequencies or the transmission of a number of frequencies successively to cover a given spectrum width. Such systems, however, would require that all of the transmitter arrangements of presently installed beacons be replaced. At the present time the use of localizers operating on a single radio frequency has progressed to such an extent that it is not economically advisable to change all of the present equipment. Thus, a solution of the problem to correct for the course bend problem without the use of such wide spectrums is being actively sought.

It is a principal object of my invention to provide a system wherein correction for course distortion caused by reradiation or reflections may be obtained without the use of a special wide radio frequency spectrum.

It is a further object of my invention to provide a system for reducing course bends in radio beacon radiations by providing auxiliary radiators energized at the same radio frequency as the principal radio beacon.

It is a still further object of my invention to provide a system wherein errors produced by reflection in radio beacon courses may be largely eliminated or reduced by the radiation of energy at the same radio frequency as the beacon from a point spaced at a half wavelength or greater distance from the principal localizer beacon.

According to a feature of my invention, I provide, in cooperation with the principal localizer beacon, one or more auxiliary beacons. These auxiliary beacons are energized with the same radio frequency and signals as the principal localizer beacon and are spaced therefrom a distance preferably a half wavelength or greater at the operating radio frequency. Means is provided successively to energize the principal localizer beacon and the additional auxiliary beacons so that the energy directly radiated along the course line will not be cancelled out due to interference of the direct radiation. However, because of the spacing of these units the reflection pattern from reflecting objects in the field of the beacon will be largely neutralized in the receiver equipment so that the course bends and false courses which otherwise would be set up are substantially eliminated.

A better understanding of my invention and the objects and features thereof may be had from the particular description of some specific embodiments thereof made with reference to the accompanying drawing, in which:

Fig. 1 is a diagrammatic illustration used in explaining the principles of my invention;

Fig. 2 is a curve illustrating how auxiliary beacons in accordance with my invention may serve to neutralize course bends normally produced;

Figure 3:
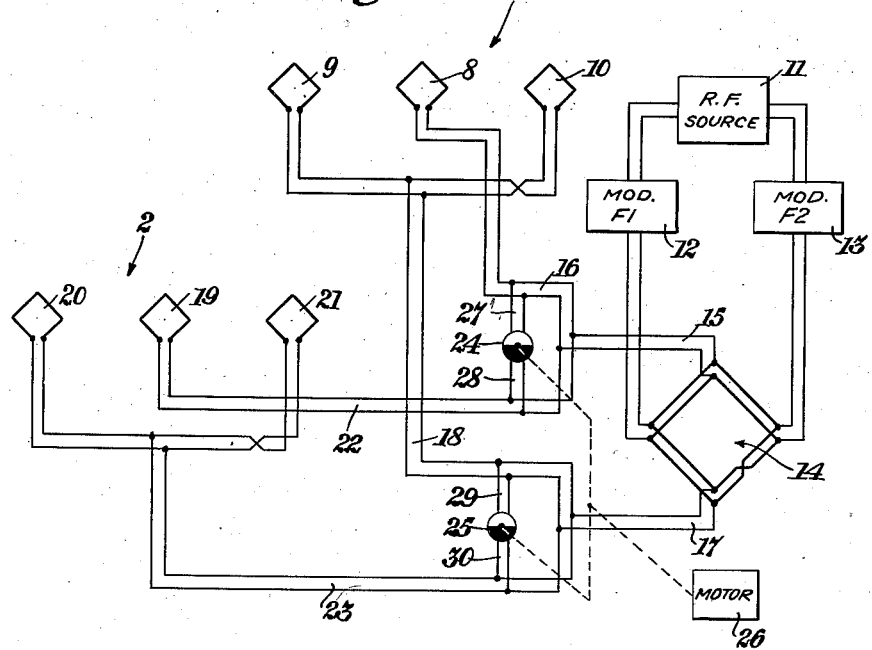
Fig. 3 is a block circuit diagram of a radio beacon illustrating the principles of my invention.

Turning first to Fig. 1, a localizer beacon preferably of the type producing overlapping patterns characterized by different signals transmitted on the same radio frequency is shown at $1$. $2$ represents a reflecting object in the field of localizer beacon $1$, and $3$ represents a beacon receiver which may be located at any point along the line $4$ which represents the course defined by beacon $1$. The field $F_{13}$ at point $3$ may then be expressed by the equation $$F_{13} = \sin(\omega t + S_{01} + S_1) + n \sin(\omega t + D_1 + S_2)$$

in which the first term on the right is the signal from radiator $1$ and the second term that from $2$. $S_{01}$ represents the distance from the radiator $1$ to a line normal to the course from reflector $2$. $S_1$ represents the distance from this normal line to receiver point $3$ and $S_2$ from the reflector object to point $3$, $n$ represents the amplitude of signal from reflector $2$ and $D_1$ the distance between $1$ and $2$. Since the reflected energy from $2$ is very much less than $1$, the equation may then be reduced by binomial expansions to $$F_{13} = 1 + \frac{n^2}{2} + n \cos\left[(S_1 - D_1) - \frac{(D_1 \sin \theta)^2}{2S_1}\right]$$

This represents the course produced by the beacon in conjunction with reflected energy and produces a curve as shown in solid lines at $5$ in Fig. 2.

If now, a second auxiliary radiator $6$ is provided as shown in Fig. 1 spaced a distance $D_2$ from reflecting object 2 and a distance $S_{02}$ from the said line normal to the course, the spacing being such that $S_{01}-S_{02}$ equals 180° then $S_{01}-D_1$ and $S_{02}-D_2$ will differ by 180°. Accordingly, the field from radiator 6 at point 3 may be expressed as follows $$F_{23}=1+\frac{n^2}{2}-n\cos\left[S_1-D-\frac{(D\sin(\theta+\Delta\theta))^2}{2S_1}\right]$$

$\Delta\theta$ here represents the increase of $\theta$, or the difference between angles $\theta$ and $\theta_2$. Since, in general, the reflecting objects such as 2 will not be very close to the beacon it can be considered that $\Delta\theta$ is negligible since in the usual installation the distance $D_1$ is large in comparison with $S_{01}-S_{02}$. With these considerations then the radiation from 6 will produce a curve as shown in dotted lines at 7 in Fig. 2. It will therefore be seen that the radiations from 1 and 6 are substantially 180° out of phase so that the radiation from 1 decreases as that from 6 increases. Thus, if the antennas are arranged so as to be successively energized, the bends normally produced will average out so that the course will be substantially straight. It is to be noted, of course, that the radiation pattern of the auxiliary radiator is in substantially directive alignment with that of the principal radiator.

It should be remembered that reflecting objects such as 2 are generally rather extensive, for example, such as hangars or the like near the airport. Therefore, the spacing between the main antenna 1 and auxiliary antennas such as 6 is not critical as there will generally be one or a number of points on the reflecting object which are different by a half wavelength or a multiple thereof so far as the lengths of path are concerned. In such a case the radiation interference will not be completely balanced out but the bends produced in the course will be reduced to a negligible value.

It is also clear that while in Fig. 1 we have indicated two antennas, the principal antenna 1 and one auxiliary antenna 6, several auxiliary radiators may be used if desired the spacing being maintained as indicated.

In Fig. 3, I have illustrated in block circuit diagram a radio beacon arrangement wherein means for successively keying two separate beacons into operation are illustrated. Beacon 1 is shown to be of the type utilizing three radiators, a central radiator 8 and two cross-connected side band radiators 9 and 10. Energy from a radio frequency source 11 is fed through two modulators 12 and 13 which produce modulation of the signal energy at frequencies F1 and F2. The modulation energy from 12 and 13 is applied to diagonally opposite terminals of a transmission line bridge circuit 14. From one of the other terminals of the bridge circuit, a transmission line 15 supplies energy modulated with the two side band frequencies which may be further transmitted over a line 16 to central antenna 8. Thus, antenna 8 transmits both of the side bands plus the carrier frequency. At the opposite bridge terminal from the connection point of antenna 8 is provided another transmission line 17. It will be noted here that since the bridge 14 has a transposition in one of the arms connected to line 17, the carrier frequency energy will be substantially balanced out and simultaneously one of the side bands will be reversed in phase with respect to the side bands supplied to antenna 8. The energy from line 17 may then be supplied over a transmission line 18 to antennas 9 and 10. Because of the phase reversal and because there is a 90° phase shift in the normal carrier energy between that supplied to antennas 9, 10 and that supplied to antenna 8, there will be produced overlapping patterns having modulation characterizing the course on one side by frequency F1 and on the other side by frequency F2. This is a known form of localizer beacon.

The auxiliary localizer beacon 2 comprises a central antenna 19 and two side band radiators 20 and 21 similar in structure to those described in connection with antenna 1. The central radiator 19 is supplied with energy over line 15 and line 22 while the side band radiators 20 and 21 are supplied over line 17 and line 23.

In order alternately to energize beacons 1 and 2, I have illustrated a mechanical switching circuit comprising rotary conductive means 24 and 25 synchronously driven by a motor 26. Quarter wave transmission lines 27 and 28 connect lines 16 and 22 respectively to rotary conductive means 24, and are spaced respectively a quarter of a wavelength from the junction of line 15 with lines 16 and 22. Similarly, quarter wave line sections 29 and 30 are connected between lines 18 and 23 respectively and rotary means 25, at a quarter wave spacing from the junction of these lines with line 17. Rotary switch elements 24 and 25 are made so that they are half conductive and half insulating. In the position shown, lines 28 and 30 are open circuited and as such produce effective short circuiting of lines 22 and 23. However, quarter wave sections 27 and 29 are effectively short circuited and as such have substantially infinite impedance and present no obstruction to energy passing over lines 16 and 18 to antennas 8, 9 and 10 of beacon 1. However, as the conductive means rotate, stub lines 27 and 29 become open circuited while lines 28 and 30 become short circuited cutting off feed of energy to beacon 1 while permitting such feed to beacon 2. Thus, the two antennas may be rendered alternately effective for radiation purposes.

While I have shown mechanical means for effecting the switching, it is clear that other means may be used such as electronic switches. Also, different types of circuits than the short circuiting stub arrangement may be used for the switching operation if desired. It is to be understood that the rate at which the principal and the auxiliary radiators are energized is preferably such that it will not be capable of being recorded by a course indicator, such as a cross-pointer instrument.

Figure 4:
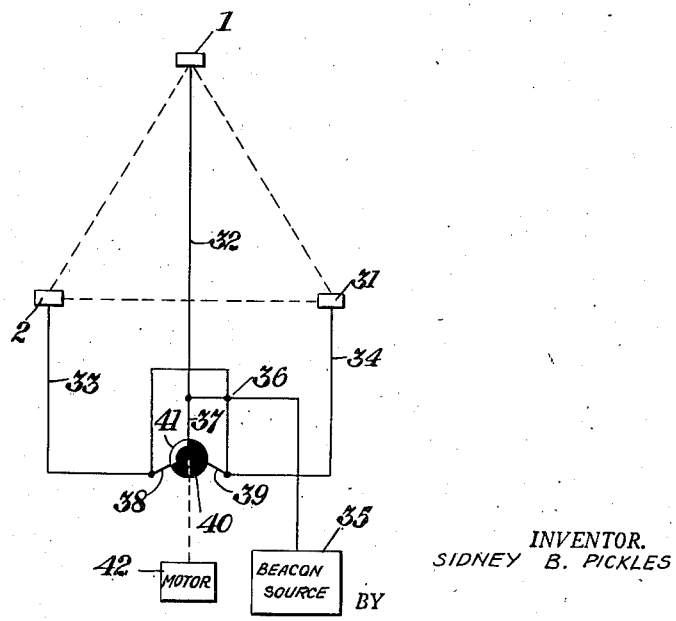
Fig. 4 is a further block circuit diagram illustrating how a plurality of auxiliary radiators may be used in conjunction with the main beacon radiator.

Instead of a single auxiliary radiator such as shown at 2, Figs. 1 and 3, other radiators may be provided as desired. As shown in Fig. 4 there are provided a main radiator 1 and two auxiliary radiators 2 and 31. The spacing among beacons 1, 2 and 31 is some value greater than a half a wavelength and may, for example, be made any number of odd half wavelengths if desired. The feed lines from the antennas 1, 2 and 31 shown at 32, 33 and 34 are interconnected to a common beacon source 35 at a junction point 36. At effectively quarter wave spacings from junction point 36 on lines 32, 33 and 34 may be provided quarter wave stub transmission lines 37, 38 and 39 respectively, associated with the rotary switching element 40 having a conductive segment 41 covering substantially one-third of its periphery. Disc 40 may be rotated by motor 42 so as successively to energize antennas 1, 31 and 2. As previously mentioned other switching means known in the art may be provided.

It should be distinctly understood that while I have shown one or two auxiliary beacon radiators any desired number at varying spacings may be utilized. Likewise, it will be clear that the auxiliary beacons may be arranged in line with the principal beacon if desired but preferably are displaced so as not to furnish further obstruction to the localizer course. It will further be clear that any type of beacon desired may be utilized in accordance with the principles of my invention and it is therefore not necessarily limited to the type specifically illustrated. It should be clearly understood that the particular forms illustrated herein are given merely by way of illustration and are not to be considered as limitations on the scope of my invention as set forth in the objects thereof and in the appended claims.

I claim:

1. In a radio beacon system of the type wherein a course is defined by directively transmitted radio signals, a system for reducing interference effects caused by reradiating objects in the path of said radiated signals, comprising a second radio beacon spaced from the first beacon a distance at least one-half a wavelength at the operating radio frequency, a modulated signal source, and means for effectively coupling said signal source successively to said first beacon and said second beacon.

2. A beacon according to claim 1 wherein the spacing between said first and second beacon is an odd integral multiple of half wavelengths.

3. In a radio beacon system providing a directed field course from a transmitting point, the method of reducing interference from reradiating objects comprising applying to the directed field an additional field at a point remote from said transmitting point by at least 180° at the operating frequency, and controlling the two transmissions differentially, the rate of differential application being higher than that of the course indicator.

4. In a radio beacon system of the type wherein a course is defined by directively transmitted radio signals, a system for reducing interference effects caused by reradiating objects in the path of said radiated signals, comprising a second radio beacon spaced from the first beacon a distance at least one-half a wavelength at the operating radio frequency and from said reflecting objects an odd integral number of half wavelengths, a modulated signal source, means for differently and effectively coupling said signal source successively to said first beacon and said second beacon.

5. In a radio beacon system of the type wherein a course is defined by directively transmitted radio signals, a system for reducing interference effects caused by reradiating objects in the path of said radiated signals, comprising a plurality of auxiliary radio beacons spaced from the first beacon a distance at least one-half a wavelength at the operating radio frequency, a modulated signal source, and means for effectively coupling said signal source successively to said first beacon and to each of said auxiliary beacons.

6. In a radio beacon system of the type wherein signals are transmitted on a single radio frequency over a directive radiation pattern, a system for reducing interference from reradiating objects in the field of the beacon, comprising an auxiliary radio beacon substantially similar to the principal localizer beacon spaced therefrom a distance at least equal to a half wavelength and having its radiating pattern substantially aligned with said principal localizer beacon, and means for energizing said principal localizer beacon and said auxiliary beacon successively at a rate differing from the signal frequencies.

7. A beacon system according to claim 6 wherein the spacing between said beacons is small with respect to the distance to said reradiating objects, and is substantially an odd integral multiple of a half wavelength.

8. In a radio localizer beacon system of the type wherein signals are transmitted on a common radio frequency over separate directive radiation patterns overlapping in space to provide a zone of equal signals, a system for reducing interference from reradiating objects in the field of the beacon which tend to cause mutiple courses or bends in the path defined by the beacon, comprising an auxiliary radio beacon substantially similar to the principal localizer beacon spaced from said localizer beacon a distance at least as great as a half wave and having a radiation pattern substantially aligned with the pattern of said principal localizer beacon, and means for energizing said principal localizer beacon and said auxiliary beacon in succession at a rate differing from the signal frequencies whereby a resultant course indication is provided.

9. In a radio localizer beacon system of the type wherein signals are transmitted on a common radio frequency over separate directive radiation patterns, overlapping in space to provide a zone of equal signals, a system for reducing interference from a reradiating object in the field of the beacon which tends to cause multiple courses or bends in the path defined by the beacon, comprising an auxiliary radio beacon substantially similar to the principal localizer beacon spaced from said reradiating object by a distance differing from the spacing of said localizer beacon by substantially electrically a half wavelength at said radio frequency and having its radiation pattern substantially aligned with that of said principal localizer beacon, and means for energizing said principal localizer beacon and said auxiliary beacon at a rate differing from the signal frequencies whereby a resultant course indication wherein the distortion caused by reflections is provided.

10. In a radio localizer beacon system of the type wherein signals are transmitted on a common radio frequency over separate directive radiation patterns overlapping in space to provide a zone of equal signals, a system for reducing interference from reradiating objects in the field of the beacon which tend to cause multiple courses or bends in the path defined by the beacon, comprising a plurality of auxiliary radio beacons substantially similar to the principal localizer beacon spaced from said localizer beacon and from each other a distance at least equal to a half wavelength at said radio frequency and having their radiation patterns substantially aligned with the pattern of said principal localizer beacon, and means for successively energizing said principal localizer beacon and each of said auxiliary beacons at a rate of succession differing from the signal frequencies whereby a resultant course indication is provided.

11. A system according to claim 10 wherein two auxiliary radio beacons are provided, the spacings of all said radio beacons from one another being substantially equal.

SIDNEY B. PICKLES.